(12) United States Patent
Malan et al.

(10) Patent No.: US 12,487,143 B1
(45) Date of Patent: Dec. 2, 2025

(54) LEAK DETECTION IN TRANSFORMERS (71) Applicant: Saudi Arabian Oil Company, Dhahran (SA)

(72) Inventors: Johannes Daniel Malan, Dhahran (SA); Mansoor Zahrani, Dhahran (SA); Rafat Rob, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 8 days.

(21) Appl. No.: 18/677,446

(22) Filed: May 29, 2024

(51) Int. Cl.
| G08B 21/20 | (2006.01) |
| G01M 3/02 | (2006.01) |
| G01N 33/28 | (2006.01) |
| H01F 27/40 | (2006.01) |

(52) U.S. Cl.
CPC .......... *G01M 3/02* (2013.01); *G01N 33/2847* (2013.01); *G08B 21/20* (2013.01); *H01F 27/402* (2013.01); *H01F 2027/404* (2013.01); *H01F 2027/406* (2013.01)

(58) Field of Classification Search
CPC ..... G01M 3/02; G01N 33/2847; G08B 21/20; H01F 27/402; H01F 2027/404; H01F 2027/406
See application file for complete search history.

(56) References Cited

U.S. PATENT DOCUMENTS

| 5,343,045 | A * | 8/1994 | Gupta | ................ | G01N 21/4738 |
| | | | | | 356/418 |
| 7,516,651 | B2 * | 4/2009 | Aubin | ..................... | G01N 25/56 |
| | | | | | 73/75 |
| 8,441,358 | B2 * | 5/2013 | Santos | ..................... | H02H 7/04 |
| | | | | | 340/584 |
| 11,357,131 | B1 | 6/2022 | Enright et al. | | |
| 2004/0159146 | A1 * | 8/2004 | Belanger | ............ | G01N 33/2847 |
| | | | | | 73/73 |
| 2021/0063496 | A1 * | 3/2021 | Harris | ..................... | G01R 31/62 |
| 2023/0077781 | A1 * | 3/2023 | Hutson | ..................... | G01J 5/00 |
| | | | | | 324/547 |

FOREIGN PATENT DOCUMENTS

| EP | 3775944 | 10/2023 |
| WO | WO 2021155012 | 8/2021 |

OTHER PUBLICATIONS

Jiroutek, "Moisture in Transformer Oil Behavior: A deeper look into a complex phenomenon," Vaisala, May 2016, 34 pages.

(Continued)

*Primary Examiner* — Nay Tun
(74) *Attorney, Agent, or Firm* — Fish & Richardson P.C.

(57) ABSTRACT

Example methods and systems for leak detection in transformers are disclosed. One example method includes obtaining moisture data of a substance in a power transformer. A functional relationship between relative saturation of moisture of the substance and temperature of the substance is determined based on the moisture data. A gradient of the relative saturation with respect to the temperature of the substance is determined based on the functional relationship. It is determined, based on the gradient, that a leak of moisture of an environment surrounding the power transformer into the power transformer has occurred. In response to determining that the leak has occurred, a visual alert or an audio alert is generated to indicate that the leak has occurred.

20 Claims, 6 Drawing Sheets

(56) References Cited

OTHER PUBLICATIONS

Lewand, "Understanding Water in Transformer Systems—The Relationship Between Relative Saturation and Parts per Million (ppm)," Chemist's Perspective, 2002, 4 pages.
Mladenov et al., "Water Saturation Limit of Transformer Oil," IEEE Electrical Insulation Magazine, Jan./Feb. 2009, 25(1):23-30, 8 pages.
Roizman et al., "Advanced Moisture Assessment for Transformers," The International Electrical Testing Association Journal, 2020, pp. 84-93, 10 pages.
Tenbohlen et al., "Water Saturation Limits and Moisture Equilibrium Curves of Alternative Insulation Systems," CIGRE SC A2 & A1 Joint Colloquium, 2011, 8 pages.

* cited by examiner

LEAK DETECTION IN TRANSFORMERS

TECHNICAL FIELD

The present disclosure relates to computer-implemented methods and systems for leak detection in transformers.

BACKGROUND

A hermetically sealed transformer is designed to be hermetically sealed throughout its life, however it can be prone to developing leak points over time. The leak points on the transformer may allow moisture from ambient environment to enter the transformer, for example, from the bolted top cover of the transformer where accessories are installed, and therefore the bolted top cover can include potential leak points.

SUMMARY

The present disclosure involves methods and systems for leak detection in transformers. One example method includes obtaining moisture data of a substance in a power transformer. A functional relationship between relative saturation of moisture of the substance and temperature of the substance is determined based on the moisture data. A gradient of the relative saturation with respect to the temperature of the substance is determined based on the functional relationship. It is determined, based on the gradient, that a leak of moisture of an environment surrounding the power transformer into the power transformer has occurred. In response to determining that the leak has occurred, a visual alert or an audio alert is generated to indicate that the leak has occurred.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the substance is mineral insulating oil, and properties of the substance include at least one of heat transfer, electrical insulation, or affinity for moisture.

In some implementations, determining the functional relationship includes determining the functional relationship based on the moisture data and saturation of the substance at the temperature of the substance.

In some implementations, determining the leak of moisture includes comparing the gradient to a predetermined threshold.

In some implementations, determining the leak of moisture further includes determining that the gradient is higher than the predetermined threshold at a first temperature, and in response to determining that the gradient is higher than the predetermined threshold at the first temperature, determining that the leak has occurred.

In some implementations, obtaining the moisture data includes obtaining the moisture data from a moisture sensor coupled to the power transformer.

In some implementations, generating the visual alert or the audio alert includes providing the visual alert or the audio alert through an interface to a user of the power transformer.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Leak points on a transformer may not be easily detected because a leak can occur in the form of nitrogen gas leak and may not spill substances that may be detected more easily, for example, oil. In some cases, when a leak occurs, the transformer gets moisture directly from the atmosphere surrounding the transformer, resulting in eventual, premature failure of the transformer.

This disclosure describes systems and methods for monitoring relative moisture saturation trend of substances in a transformer and generating alerts about potential leaks of the transformer. In some cases, the disclosed methods can be performed by a monitoring system. The monitoring system can be fitted to the transformer and can include (1) a moisture sensor to sense moisture in a substance, for example, mineral isolating oil, in the transformer; (2) a controller, for example, a micro programmable logic controller (PLC), to analyze the sensed moisture and determine whether to generate the alerts; and/or (3) a power source, for example, a solar voltaic power source, to provide power to the monitoring system. Therefore, the monitoring system can be self-powered. In some cases, the substance can have various properties. For example, the substance can be used for heat transfer (e.g., cooling) and/or electrical insulation. The substance can also have affinity for moisture (e.g., hygroscopic property) that negatively impacts the insulation properties of the substance and accelerates aging of the transformer.

In some cases, to determine whether to generate the alerts, the monitoring system can generate, based on the sensed moisture, a thermodynamic pattern of the sensed moisture, where the thermodynamic pattern represents an amount of moisture contained in the substance in the transformer, for example, oil, as a function of the temperature of the substance. The thermodynamic pattern can indicate a capacity of the substance in the transformer to contain moisture at different temperatures of the substance. The gradient of the thermodynamic pattern can then be used to determine whether to generate the alerts. The alerts can indicate whether a leak has occurred. The monitoring system can also determine the severity of the leak and/or the estimated time before a failure of the transformer occurs. In some cases, the severity of the leak relates to the relative saturation profile of a transformer. For example, for a dry transformer, the relative saturation profile approximates a flat line, i.e., a profile unique to the transformer and linked to remanent moisture from the manufacturing process. When moisture enters into the substance in the transformer, for example, oil, the effective slope of the relative saturation profile starts to rise. In some cases, a gradual rise of the relative saturation profile can be due to the normal aging of the transformer over a relatively long time, and the slope of the relative saturation profile can translate into aging rate, health forecast, mitigation maintenance, and/or anticipated retirement of the transformer. In these cases no reactive responses are triggered. In some other cases, an exponential rise of the relative saturation profile can indicate abnormal moisture entry from which the severity of the leak/moisture entry is determined (e.g., sign of incipient failure of the transformer depending on the rate of the rise of the relative saturation profile), and can trigger reactive response.

The disclosed systems and methods provide many advantages over existing systems. Examples of the disclosed systems can be systems for transformers in the Medium Voltage category and can be designed to be hermetically sealed and cost effective. As one example, the disclosed methods can provide a cost-effective approach for maintaining transformers by detecting leaks in transformers and preventing failures of the transformers. As another example, the disclosed methods can avoid premature failures of transformers and thereby avoiding costs associated with catastrophic transformer failure that may result in collateral damage.

Figure 1:
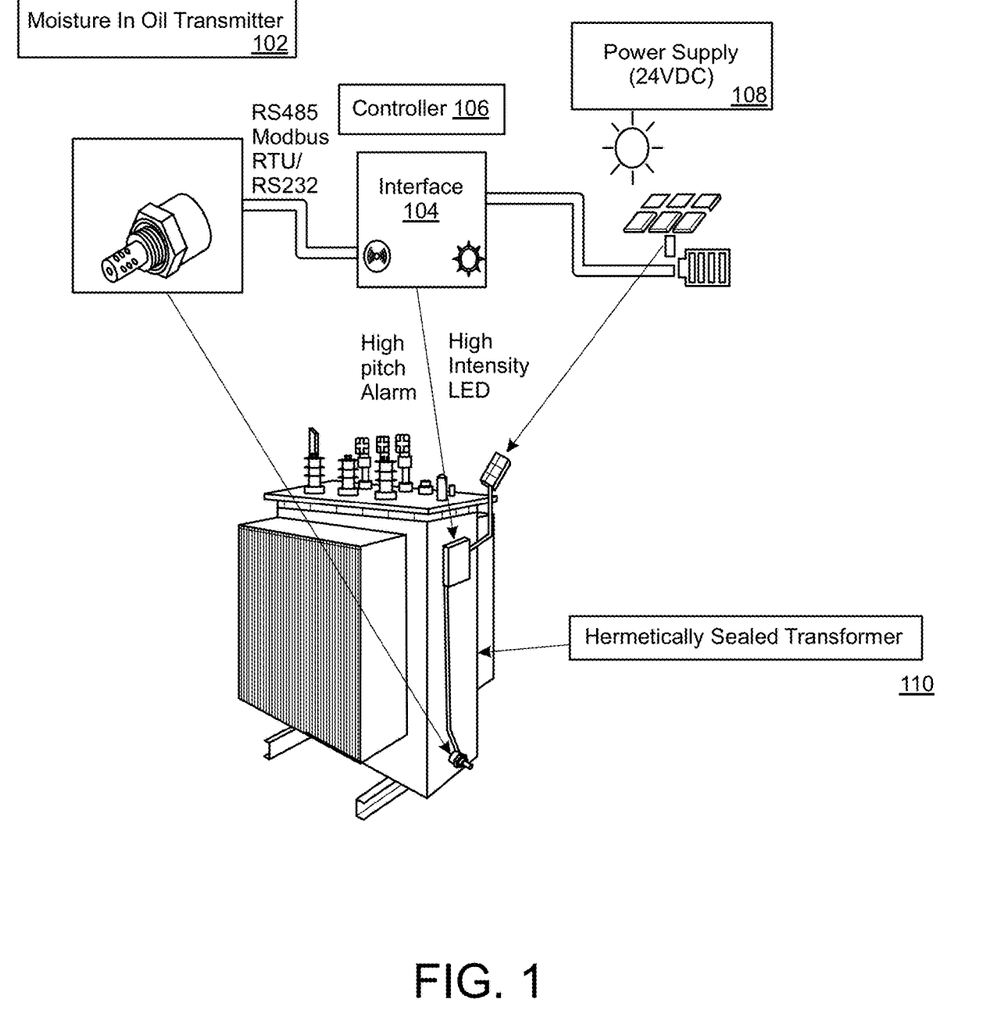
FIG. 1 illustrates an example monitoring system for detecting leaks of a transformer, according to some implementations.

FIG. 1 illustrates an example monitoring system 100 for detecting leaks of a transformer. In some implementations, monitoring system 100 can include a sensor that senses moisture in a substance, for example, oil, in transformer 110. In some cases, transformer 110 can be a power transformer. Transformer 110 can be a hermetically sealed transformer. Example output voltage range of transformer 110 can be less than 13.8 kV, including power transformers designed under standard 14-SAMSS-534 (pole mounted transformer up to 500KVA) and limited 14-SAMSS-531. Monitoring system 100 can also include transmitter 102, interface 104, controller 106, and/or power supply 108. The sensor can be coupled to transmitter 102, which can transmit the sensed moisture from the sensor to controller 106. In some cases, the sensor and transmitter 102 can be integrated, for example, into a moisture in oil transmitter. Controller 106 can be used to determine, based on the sensed moisture, whether there is a leak in transformer 110. If a leak is determined to have occurred, controller 106 can generate an alert about the leak and send the alert to interface 104 for display. An example of controller 106 is a programmable logic controller (PLC). Interface 104 can display the alert using an LED, for example, a high intensity LED, and/or produce an audio alert, for example, a high pitch alarm. In some cases, Power supply 108 can be used to provide power to monitoring system 100. In some cases, power supply 108 can be a solar voltaic power source.

Figure 2:
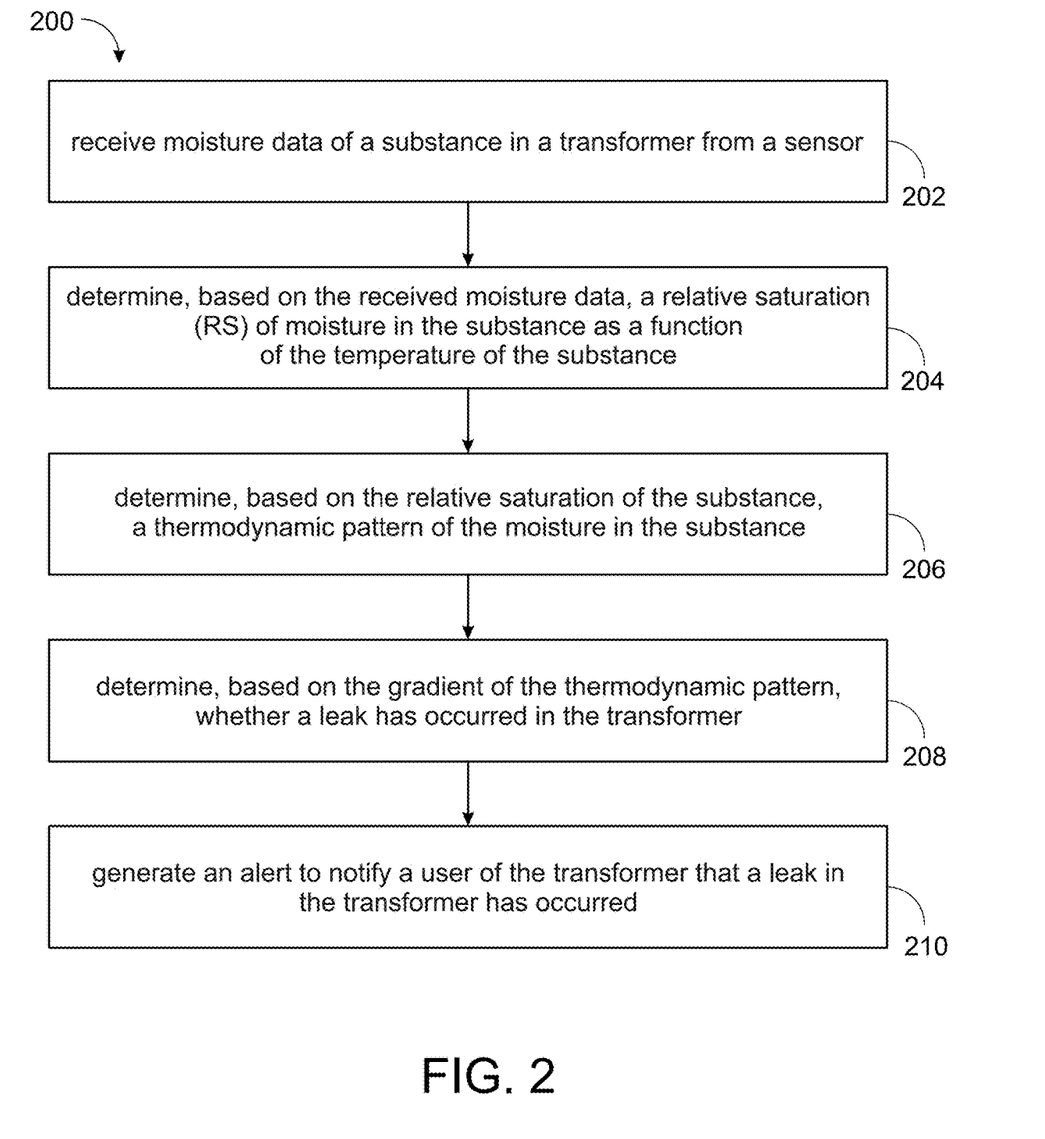
FIG. 2 illustrates an example process for detecting leaks of a transformer, according to some implementations.

FIG. 2 illustrates an example process 200 for detecting leaks of a transformer. For convenience, process 200 will be described as being performed by a computer system having one or more computers located in one or more locations and programmed appropriately in accordance with this specification. An example of the computer system is the computer system 500 illustrated in FIG. 5. Another example of the computer system is controller 106 illustrated in FIG. 1.

At 202, a computer system receives from a sensor, moisture data of a substance in a transformer. An example of the substance in the transformer is oil. In some implementation, the sensor measuring the moisture of the substance can be a moisture sensor. The moisture data can be sent to the computer system by a transmitter coupled to the sensor. The moisture data can be digital signal, for example, RS485 Modbus® remote terminal unit (RTU) or RS232 digital signal, or analog signal with amplitude of current within a specific range, for example, 4 to 20 mA. In some cases, the computer system can obtain historical data to establish normal operating parameters for the transformer. In some cases, the computer system can clean the sensor data by removing noise and/or outliers in the sensor data. The computer system can also normalize the sensor data to ensure consistency across different sensor types.

At 204, the computer system determines, based on the received moisture data, a relative saturation (RS) of moisture in the substance as a function of the temperature of the substance. In some cases, a moisture sensor can provide both a temperature output and a relative saturation output of the substance. The relative saturation can be determined using Equation 1 below, where rS is relative saturation as percentage at a particular temperature of the substance, WCO represents water content in the substance (i.e., moisture data received from the sensor) and is independent of the temperature of the substance, and WCOT represents saturation level of the substance at the particular temperature of the substance. Both WCO and WCOT can be measured by a moisture sensor.

$$rS=100(WCO/WCOT) \tag{1}$$

In some implementations, the relative saturation of moisture in the substance can represent the amount of moisture in the substance at the particular temperature of the substance, and therefore can indicate a capacity of the substance to contain moisture. In some cases, the relative saturation of moisture in the substance can be affected by available moisture in the transformer, the temperature of the substance in the transformer, and/or the properties of the substance. In some cases, transformer oil can be hygroscopic in nature and governed by manufacturing standards. Therefore the level of saturation can be effectively the same for all insulating oils in the transformer industry. If the type of oil used is known, the hygroscopic capacity is known and the saturation level can be determined. For example, manufacturing standards such as IEEE C57.106 and/or IEC 60422 can provide guidelines relevant to all transformers with mineral insulating oil for moisture saturation levels.

At 206, the computer system determines, based on the relative saturation of the substance from 204, a thermodynamic pattern of the moisture in the substance. In some cases, the thermodynamic pattern represents the functional relationship between the relative saturation of the substance and the temperature of the substance.

At 208, the computer system determines, based on the gradient of the thermodynamic pattern, whether a leak has occurred in the transformer. In some cases, the gradient represents the slope of the thermodynamic pattern. For example, when the transformer does not have moisture, the gradient is zero. In some cases, oil and/or paper insulation properties of the transformer can be affected by moisture in oil in the transformer. In some implementations, a sudden change of the thermodynamic pattern at a particular temperature can indicate whether a leak in the transformer has occurred. In some cases, when the gradient of the thermodynamic pattern at a particular temperature is lower than a predetermined threshold, the computer system can determine that there is no leaks in the transformer. In some cases, the predetermined threshold can depend on one or more factors, for example, the amount of moisture that was left in the transformer after the transformer is manufactured, the rating of the transformer, the rated voltage, and/or the insulation system used to manufacture the transformer (e.g., paper or enameled conductors, synthetic or paper based blocks, etc.). When the gradient of the thermodynamic pattern at a particular temperature is higher than the predetermined threshold, the computer system can determine that a leak in the transformer has occurred. Relatively large gradient of the thermodynamic pattern can indicate that moisture movement between insulation of the transformer and the substance in the transformer has occurred, and the transformer can be at risk of failure because the moisture in the insulation of the transformer can affect the basic insulation level (BIL) of the transformer. In some cases, relatively high level of the gradient of the thermodynamic pattern can indicate that some byproducts of the aging of the transformer, for example, acidity, hydrogen, breakdown voltage (BDV) of transformer oil, intermediate frequency transformer (IFT), and/or overhaul/replacement of units in the transformer, have impaired the health of the transformer.

In some implementations, the computer system can identify key features from the sensor data that are indicative of potential leaks. The key features can include sudden changes in temperature and moisture content. In some cases, the computer system can use statistical methods or signal processing techniques to extract the key features from the sensor data.

In some implementations, different methods can be used to detect sudden changes in temperature and moisture content. For example, supervised adaptive algorithms such as Support Vector Machines (SVM), Random Forests, and/or Gradient Boosting Machines can be trained on labeled sensor data (e.g., normal vs. abnormal). In another example, the computer system can use machine learning gradient boosting that uses pseudo-residuals rather than the standard residuals in a functional space. The machine learning gradient boosting can offer a set of weak prediction models as a prediction model. A gradient-boosted tree method can employ a decision tree as the weak learner. Compared to random forest, the gradient-boosted tree method can result in better performance. Other boosting approaches and/or gradient-boosted trees can build models step-by-step. In yet another example, unsupervised learning algorithms such as Isolation Forest, One-Class SVM, and/or Gaussian Mixture Models can be used for detecting anomalies without labeled sensor data.

In some implementations, historical sensor data can be used to train the machine learning (ML) models, to obtain a balanced dataset with both normal and abnormal instances.

In some implementations, the trained ML models can be deployed to monitor real-time sensor data from the transformer and to continuously evaluate incoming sensor data against the learned patterns and thresholds.

At 210, if the computer system determines at 208, a leak has occurred in the transformer, the computer system can generate an alert to notify a user of the transformer that a leak in the transformer has occurred. In some implementations, the computer system can control an interface, for example, interface 104 in FIG. 1, to produce the alert on the interface. For example, the alert can include intermittent flashing LED indication on the interface, and the LED indication can be visible up to a particular distance, such as 600 meters. In another example, the alert can combine the flashing LED indication with intermittent audible pulses. In some cases, the computer system can control the interface through a wireless communication link, in order to produce the alert on the interface.

In some implementations, when the trained ML models detect anomalies indicative of a potential leak, an alarm or alert can be triggered. In some cases, the computer system can implement mechanisms for prioritizing alerts based on the severity of the detected anomaly.

In some implementations, the leak detection system describe in 202 to 210 can be integrated with the transformer's control and monitoring system for seamless operation. The integrated system can ensure compatibility with existing supervisory control and data acquisition (SCADA) systems or other monitoring platforms. Communication protocols for transmitting alerts to operators or maintenance personnel can also be implemented.

In some implementations, the trained ML models can be regularly updated using new data to adapt to changing operating conditions or emerging failure patterns. Feedback from maintenance reports or inspection findings can be incorporated to improve the accuracy of the leak detection system over time.

In some implementations, when an alert is received, a detailed inspection of the transformer can be performed to locate and repair the leak. Preventive maintenance measures can be implemented to reduce the likelihood of future leaks, such as replacing worn seals or gaskets, tightening connections, or upgrading insulation materials.

In some implementations, comprehensive records of leak detection events can be maintained, including timestamped sensor data, alarm triggers, and/or maintenance actions taken. Regular reports summarizing the performance of the leak detection system and any maintenance activities performed can be generated.

Figure 3:
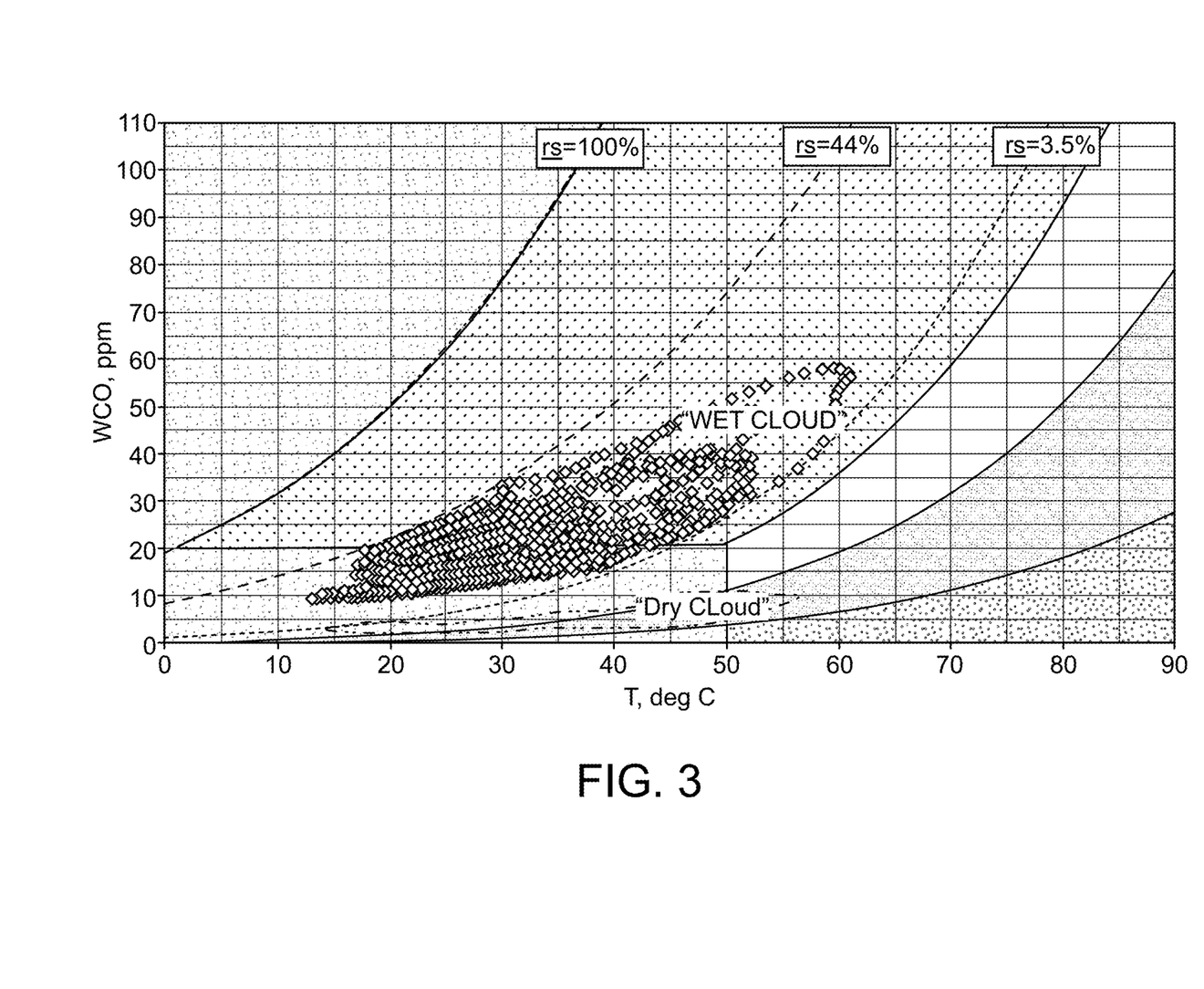
FIG. 3 illustrates an example of a functional relationship between water content in oil and temperature of the oil, according to some implementations.

FIG. 3 illustrates an example of a functional relationship between water content in oil and temperature of the oil. The "dry cloud" area in FIG. 3 corresponds to relatively low gradient of thermodynamic pattern of the oil. The "wet cloud" area in FIG. 3 corresponds to relatively high gradient of thermodynamic pattern of the oil. In some cases, the correspondence of multiple WCO values to a temperature, as shown in FIG. 3, are related to the loading cycle of a transformer, as well as the oil property that the oil contains more moisture at higher temperatures than at lower temperatures. For example, during the cooling down phase of a transformer, when the transformer passes through a specific temperature such as 40° C., the water content in the oil can be higher than that during the heating up phase of the transformer. A transformer may experience a number of loading cycles during a day, and therefore depending on the loading cycle, the transformer may pass the specific temperature (e.g., 40° C.) several times in a day, each time with the WCO determined by one or more of the following factors: (1) the amount of free moisture available in the tank (e.g., due to a leak), (2) the amount of moisture available in the paper, (3) the amount of moisture in the oil itself at that temperature, and/or (4) the amount of moisture that can diffuse out of the oil during cooling down.

Figure 4:
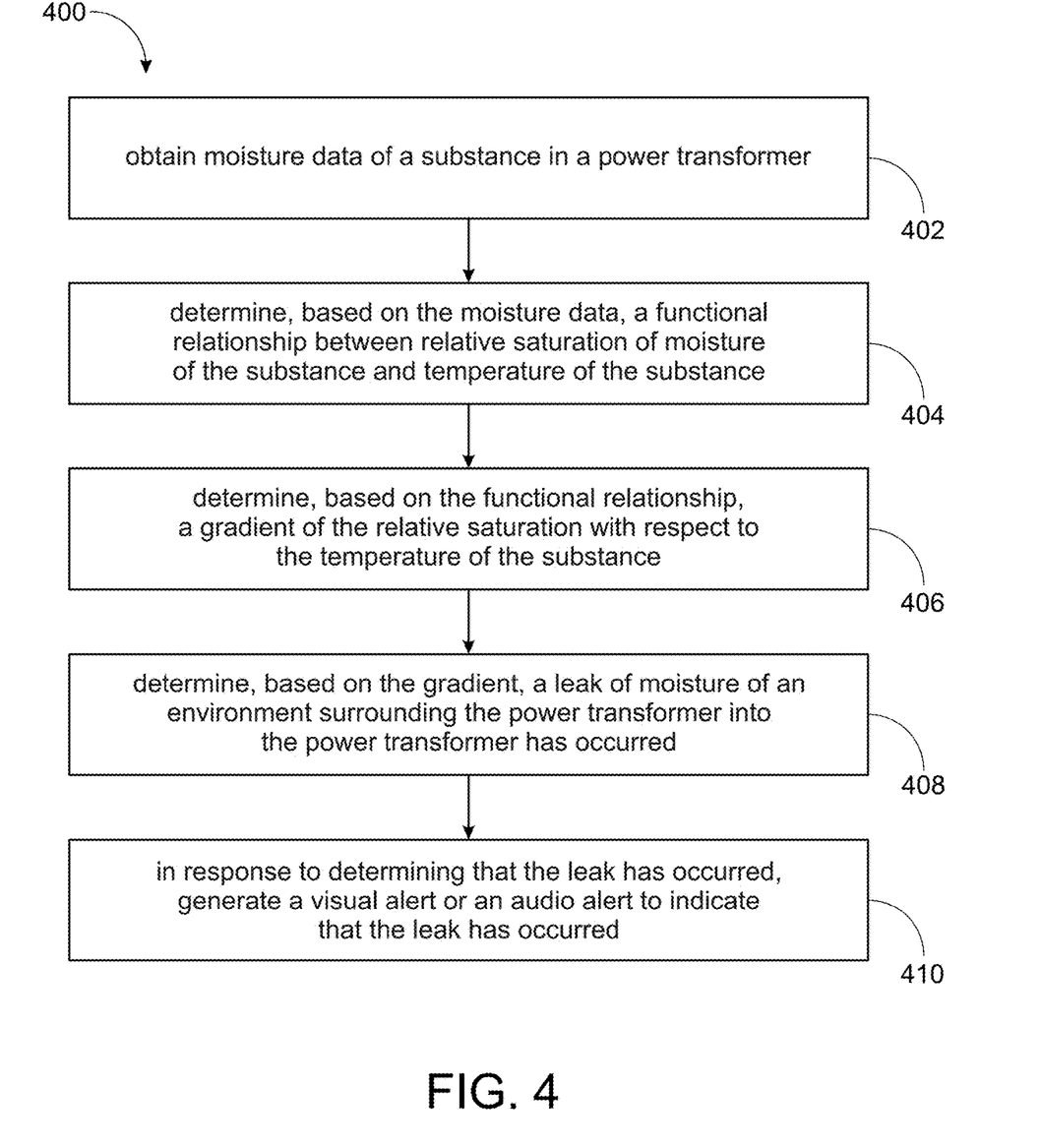
FIG. 4 illustrates an example process for detecting leaks in power transformers, according to some implementations.

FIG. 4 illustrates an example process 400 for detecting leaks in power transformers. For convenience, process 400 will be described as being performed by a computer system having one or more computers located in one or more locations and programmed appropriately in accordance with this specification. An example of the computer system is the computer system 500 illustrated in FIG. 5. Another example of the computer system is controller 106 illustrated in FIG. 1.

At 402, a computer system obtains moisture data of a substance in a power transformer.

At 404, the computer system determines, based on the moisture data, a functional relationship between relative saturation of moisture of the substance and temperature of the substance.

At 406, the computer system determines, based on the functional relationship, a gradient of the relative saturation with respect to the temperature of the substance.

At 408, the computer system determines, based on the gradient, a leak of moisture of an environment surrounding the power transformer into the power transformer has occurred.

At 410, in response to determining that the leak has occurred, the computer system generates a visual alert or an audio alert to indicate that the leak has occurred.

Figure 5:
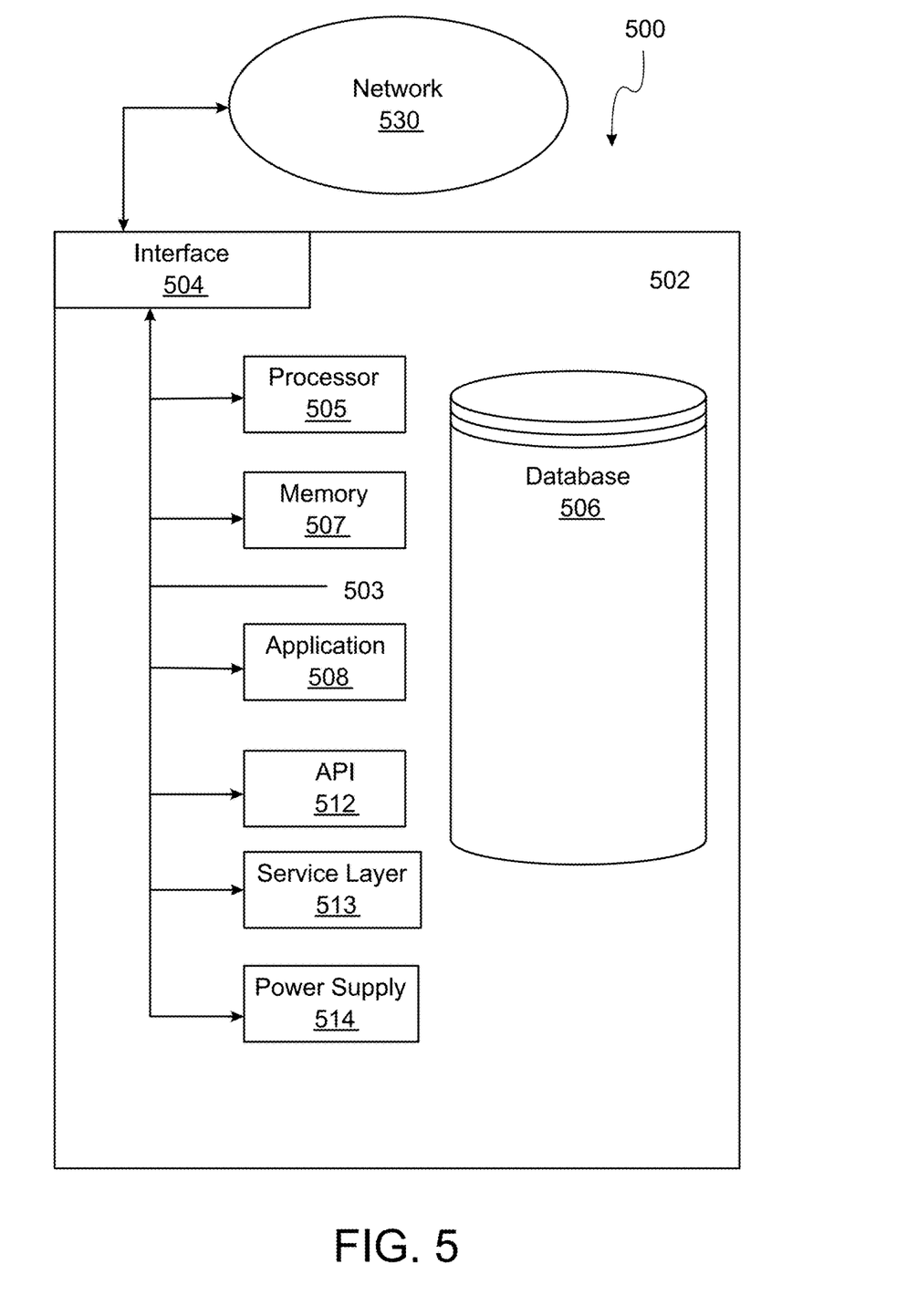
FIG. 5 is a block diagram of an example computer system that can be used to provide computational functionalities associated with described algorithms, methods, functions, processes, flows, and procedures, according to some implementations.

FIG. 5 is a block diagram of an example computer system 500 that can be used to provide computational functionalities associated with described algorithms, methods, functions, processes, flows, and procedures, according to some implementations of the present disclosure. In some implementations, the computer system performing process 200 or 400 can be the computer system 700, include the computer system 500, or the computer system performing process 200 or 400 can communicate with the computer system 500.

The illustrated computer 502 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 502 can include a Smart Embedded Management Agent (SEMA), such as a built-in ADLINK SEMA 2.2, and a video sync technology, such as Quick Sync Video technology supported by ADLINK MSDK+. In some examples, the computer 502 can include the MXE-5400 Series processor-based fanless embedded computer by ADLINK, though the computer 502 can take other forms or include other components.

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments (e.g., stand-alone environments with data buffering), global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs 512.

The service layer 513 can provide software services to the computer 502 and other components (whether illustrated or not) that are communicably coupled to the computer 502. The functionality of the computer 502 can be accessible for all service consumers using this service layer 513. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 can include an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and manipulate data to perform the operations of the computer 502, including operations using algorithms, methods, functions, processes, flows, and procedures as described in the present disclosure.

The computer 502 can also include a database 506 that can hold data for the computer 502 and other components connected to the network 530 (whether illustrated or not). For example, database 506 can be an in-memory, conventional, or a database storing data consistent with the present disclosure. In some implementations, the database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

An application 508 can be an algorithmic software engine providing functionality according to particular needs, desires, or particular implementations of the computer 502 and the described functionality. For example, an application 508 can serve as one or more components, modules, or applications 508. Multiple applications 508 can be implemented on the computer 502. Each application 508 can be internal or external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system including computer 502, with each computer 502 communicating over network 530. Further, the terms "client", "user", and other appropriate terminology can be used interchangeably without departing from the scope of the present disclosure. Moreover, the present disclosure contemplates that many users can use one computer 502 and one user can use multiple computers 502.

Figure 6:
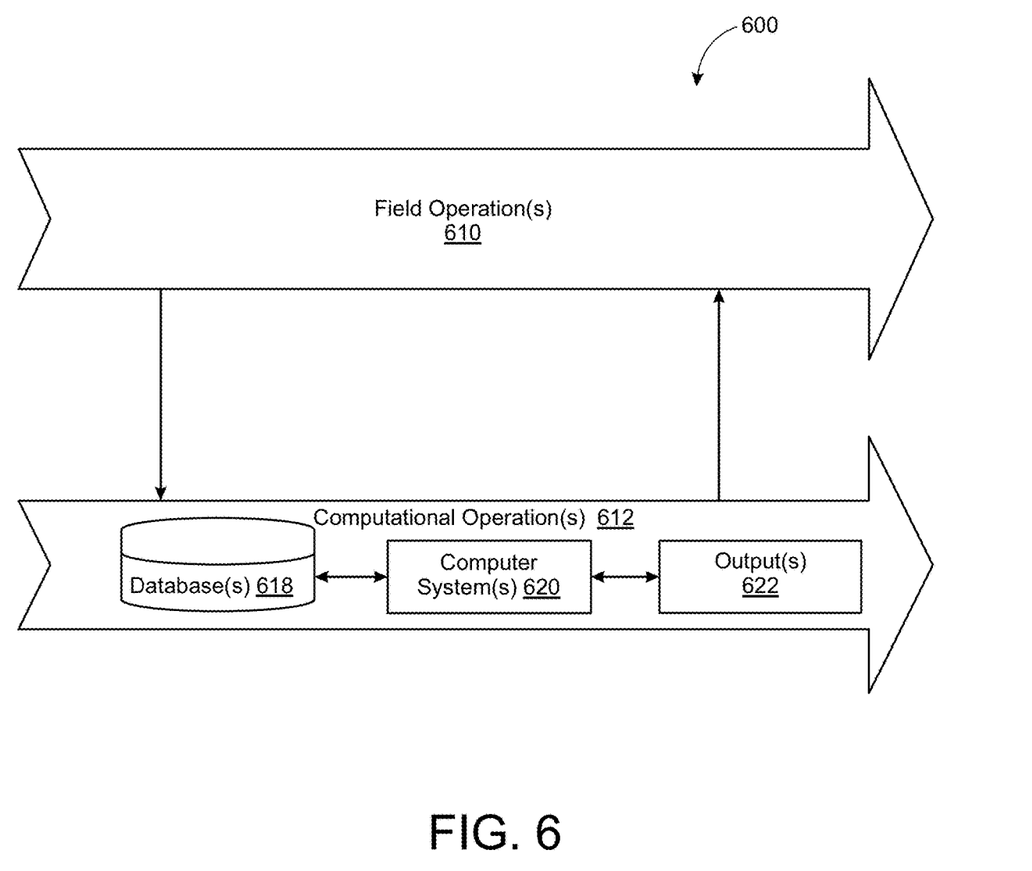
FIG. 6 illustrates hydrocarbon production operations that include both one or more field operations and one or more computational operations, which exchange information and control exploration for the production of hydrocarbons, according to some implementations.

FIG. 6 illustrates hydrocarbon production operations 600 that include both one or more field operations 610 and one or more computational operations 612, which exchange information and control exploration for the production of hydrocarbons. In some implementations, outputs of techniques of the present disclosure can be performed before, during, or in combination with the hydrocarbon production operations 600, specifically, for example, either as field operations 610 or computational operations 612, or both.

Examples of field operations 610 include forming/drilling a wellbore, hydraulic fracturing, producing through the wellbore, injecting fluids (such as water) through the wellbore, to name a few. In some implementations, methods of the present disclosure can trigger or control the field operations 610. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 610 and responsively triggering the field operations 610 including, for example, generating plans and signals that provide feedback to and control physical components of the field operations 610. Alternatively or in addition, the field operations 610 can trigger the methods of the present disclosure. For example, implementing physical components (including, for example, hardware, such as sensors) deployed in the field operations 610 can generate plans and signals that can be provided as input or feedback (or both) to the methods of the present disclosure.

Examples of computational operations 612 include one or more computer systems 620 that include one or more processors and computer-readable media (e.g., non-transitory computer-readable media) operatively coupled to the one or more processors to execute computer operations to perform the methods of the present disclosure. The computational operations 612 can be implemented using one or more databases 618, which store data received from the field operations 610 and/or generated internally within the computational operations 612 (e.g., by implementing the methods of the present disclosure) or both. For example, the one or more computer systems 620 process inputs from the field operations 610 to assess conditions in the physical world, the outputs of which are stored in the databases 618. For example, seismic sensors of the field operations 610 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 612 where they are stored in the databases 618 and analyzed by the one or more computer systems 620.

In some implementations, one or more outputs 622 generated by the one or more computer systems 620 can be provided as feedback/input to the field operations 610 (either as direct input or stored in the databases 618). The field operations 610 can use the feedback/input to control physical components used to perform the field operations 610 in the real world.

For example, the computational operations 612 can process the seismic data to generate three-dimensional (3D) maps of the subsurface formation. The computational operations 612 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 612 to process new information about the formation and control the drilling to adjust to the observed conditions in real-time.

The one or more computer systems 620 can update the 3D maps of the subsurface formation as information from one exploration well is received and the computational operations 612 can adjust the location of the next exploration well based on the updated 3D maps. Similarly, the data received from production operations can be used by the computational operations 612 to control components of the production operations. For example, production well and pipeline data can be analyzed to predict slugging in pipelines leading to a refinery and the computational operations 612 can control machine operated valves upstream of the refinery to reduce the likelihood of plant disruptions that run the risk of taking the plant offline.

In some implementations of the computational operations 612, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus", "computer", and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser. Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Embodiments

Embodiment 1: A computer-implemented method comprising obtaining moisture data of a substance in a power transformer; determining, based on the moisture data, a functional relationship between relative saturation of moisture of the substance and temperature of the substance; determining, based on the functional relationship, a gradient of the relative saturation with respect to the temperature of the substance; determining, based on the gradient, a leak of moisture of an environment surrounding the power transformer into the power transformer has occurred; and in response to determining that the leak has occurred, generating a visual alert or an audio alert to indicate that the leak has occurred.

Embodiment 2: The computer-implemented method of embodiment 1, wherein the substance is mineral insulating oil, and properties of the substance comprise at least one of heat transfer, electrical insulation, or affinity for moisture.

Embodiment 3: The computer-implemented method of embodiment 1 or 2, wherein determining the functional relationship comprises determining the functional relationship based on the moisture data and saturation of the substance at the temperature of the substance.

Embodiment 4: The computer-implemented method of any one of embodiments 1 to 3, wherein determining the leak of moisture comprises comparing the gradient to a predetermined threshold.

Embodiment 5: The computer-implemented method of embodiment 4, wherein determining the leak of moisture further comprises: determining that the gradient is higher than the predetermined threshold at a first temperature; and in response to determining that the gradient is higher than the predetermined threshold at the first temperature, determining that the leak has occurred.

Embodiment 6: The computer-implemented method of any one of embodiments 1 to 5, wherein obtaining the moisture data comprises obtaining the moisture data from a moisture sensor coupled to the power transformer.

Embodiment 7: The computer-implemented method of any one of embodiments 1 to 6, wherein generating the visual alert or the audio alert comprises providing the visual alert or the audio alert through an interface to a user of the power transformer.

Embodiment 8: A non-transitory computer-readable medium storing one or more instructions executable by a computer system to perform operations comprising: obtaining moisture data of a substance in a power transformer; determining, based on the moisture data, a functional relationship between relative saturation of moisture of the substance and temperature of the substance; determining, based on the functional relationship, a gradient of the relative saturation with respect to the temperature of the substance; determining, based on the gradient, a leak of moisture of an environment surrounding the power transformer into the power transformer has occurred; and in response to determining that the leak has occurred, generating a visual alert or an audio alert to indicate that the leak has occurred.

Embodiment 9: The non-transitory computer-readable medium of embodiment 8, wherein the substance is mineral insulating oil, and properties of the substance comprise at least one of heat transfer, electrical insulation, or affinity for moisture.

Embodiment 10: The non-transitory computer-readable medium of embodiment 8 or 9, wherein determining the functional relationship comprises determining the functional relationship based on the moisture data and saturation of the substance at the temperature of the substance.

Embodiment 11: The non-transitory computer-readable medium of any one of embodiments 8 to 10, wherein determining the leak of moisture comprises comparing the gradient to a predetermined threshold.

Embodiment 12: The non-transitory computer-readable medium of embodiment 11, wherein determining the leak of moisture further comprises: determining that the gradient is higher than the predetermined threshold at a first temperature; and in response to determining that the gradient is higher than the predetermined threshold at the first temperature, determining that the leak has occurred.

Embodiment 13: The non-transitory computer-readable medium of any one of embodiments 8 to 12, wherein obtaining the moisture data comprises obtaining the moisture data from a moisture sensor coupled to the power transformer.

Embodiment 14: The non-transitory computer-readable medium of any one of embodiments 8 to 13, wherein generating the visual alert or the audio alert comprises providing the visual alert or the audio alert through an interface to a user of the power transformer.

Embodiment 15: A computer-implemented system, comprising one or more computers; and one or more computer memory devices interoperably coupled with the one or more computers and having tangible, non-transitory, machine-readable media storing one or more instructions that, when executed by the one or more computers, perform one or more operations comprising: obtaining moisture data of a substance in a power transformer; determining, based on the moisture data, a functional relationship between relative saturation of moisture of the substance and temperature of the substance; determining, based on the functional relationship, a gradient of the relative saturation with respect to the temperature of the substance; determining, based on the gradient, a leak of moisture of an environment surrounding the power transformer into the power transformer has occurred; and in response to determining that the leak has occurred, generating a visual alert or an audio alert to indicate that the leak has occurred.

Embodiment 16: The computer-implemented system of embodiment 15, wherein the substance is mineral insulating oil, and properties of the substance comprise at least one of heat transfer, electrical insulation, or affinity for moisture.

Embodiment 17: The computer-implemented system of embodiment 15 or 16, wherein determining the functional relationship comprises determining the functional relationship based on the moisture data and saturation of the substance at the temperature of the substance.

Embodiment 18: The computer-implemented system of any one of embodiments 15 to 17, wherein determining the leak of moisture comprises comparing the gradient to a predetermined threshold.

Embodiment 19: The computer-implemented system of embodiment 18, wherein determining the leak of moisture further comprises: determining that the gradient is higher than the predetermined threshold at a first temperature; and in response to determining that the gradient is higher than the predetermined threshold at the first temperature, determining that the leak has occurred.

Embodiment 20: The computer-implemented system of any one of embodiments 15 to 19, wherein obtaining the moisture data comprises obtaining the moisture data from a moisture sensor coupled to the power transformer.

We claim:

1. A computer-implemented method comprising:
   obtaining moisture data of a substance in a power transformer;
   determining, based on the moisture data, a functional relationship between relative saturation of moisture of the substance and temperature of the substance;
   determining, based on the functional relationship, a gradient of the relative saturation with respect to the temperature of the substance;
   determining, based on the gradient, a leak of moisture of an environment surrounding the power transformer into the power transformer has occurred; and
   in response to determining that the leak has occurred, generating a visual alert or an audio alert to indicate that the leak has occurred.

2. The computer-implemented method of claim 1, wherein the substance is mineral insulating oil, and properties of the substance comprise at least one of heat transfer, electrical insulation, or affinity for moisture.

3. The computer-implemented method of claim 1, wherein determining the functional relationship comprises determining the functional relationship based on the moisture data and saturation of the substance at the temperature of the substance.

4. The computer-implemented method of claim 1, wherein determining the leak of moisture comprises comparing the gradient to a predetermined threshold.

5. The computer-implemented method of claim 4, wherein determining the leak of moisture further comprises:
   determining that the gradient is higher than the predetermined threshold at a first temperature; and
   in response to determining that the gradient is higher than the predetermined threshold at the first temperature, determining that the leak has occurred.

6. The computer-implemented method of claim 1, wherein obtaining the moisture data comprises obtaining the moisture data from a moisture sensor coupled to the power transformer.

7. The computer-implemented method of claim 1, wherein generating the visual alert or the audio alert comprises providing the visual alert or the audio alert through an interface to a user of the power transformer.

8. A non-transitory computer-readable medium storing one or more instructions executable by a computer system to perform operations comprising:
   obtaining moisture data of a substance in a power transformer;
   determining, based on the moisture data, a functional relationship between relative saturation of moisture of the substance and temperature of the substance;
   determining, based on the functional relationship, a gradient of the relative saturation with respect to the temperature of the substance;
   determining, based on the gradient, a leak of moisture of an environment surrounding the power transformer into the power transformer has occurred; and
   in response to determining that the leak has occurred, generating a visual alert or an audio alert to indicate that the leak has occurred.

9. The non-transitory computer-readable medium of claim 8, wherein the substance is mineral insulating oil, and properties of the substance comprise at least one of heat transfer, electrical insulation, or affinity for moisture.

10. The non-transitory computer-readable medium of claim 8, wherein determining the functional relationship comprises determining the functional relationship based on the moisture data and saturation of the substance at the temperature of the substance.

11. The non-transitory computer-readable medium of claim 8, wherein determining the leak of moisture comprises comparing the gradient to a predetermined threshold.

12. The non-transitory computer-readable medium of claim 11, wherein determining the leak of moisture further comprises:
    determining that the gradient is higher than the predetermined threshold at a first temperature; and
    in response to determining that the gradient is higher than the predetermined threshold at the first temperature, determining that the leak has occurred.

13. The non-transitory computer-readable medium of claim 8, wherein obtaining the moisture data comprises obtaining the moisture data from a moisture sensor coupled to the power transformer.

14. The non-transitory computer-readable medium of claim 8, wherein generating the visual alert or the audio alert comprises providing the visual alert or the audio alert through an interface to a user of the power transformer.

15. A computer-implemented system comprising:
    one or more computers; and
    one or more computer memory devices interoperably coupled with the one or more computers and having tangible, non-transitory, machine-readable media storing one or more instructions that, when executed by the one or more computers, cause the computer-implemented system to perform one or more operations comprising:
        obtaining moisture data of a substance in a power transformer;
        determining, based on the moisture data, a functional relationship between relative saturation of moisture of the substance and temperature of the substance;
        determining, based on the functional relationship, a gradient of the relative saturation with respect to the temperature of the substance;
        determining, based on the gradient, a leak of moisture of an environment surrounding the power transformer into the power transformer has occurred; and
        in response to determining that the leak has occurred, generating a visual alert or an audio alert to indicate that the leak has occurred.

16. The computer-implemented system of claim 15, wherein the substance is mineral insulating oil, and properties of the substance comprise at least one of heat transfer, electrical insulation, or affinity for moisture.

17. The computer-implemented system of claim 15, wherein determining the functional relationship comprises determining the functional relationship based on the moisture data and saturation of the substance at the temperature of the substance.

18. The computer-implemented system of claim 15, wherein determining the leak of moisture comprises comparing the gradient to a predetermined threshold.

19. The computer-implemented system of claim 18, wherein determining the leak of moisture further comprises:
    determining that the gradient is higher than the predetermined threshold at a first temperature; and
    in response to determining that the gradient is higher than the predetermined threshold at the first temperature, determining that the leak has occurred.

20. The computer-implemented system of claim 15, wherein obtaining the moisture data comprises obtaining the moisture data from a moisture sensor coupled to the power transformer.

* * * * *